(12) United States Patent
Kunisada

(10) Patent No.: US 10,975,933 B2
(45) Date of Patent: Apr. 13, 2021

(54) TRANSMISSION BELT AND METHOD FOR PRODUCING SAME

(71) Applicant: BANDO CHEMICAL INDUSTRIES, LTD., Kobe (JP)

(72) Inventor: Takashi Kunisada, Kobe (JP)

(73) Assignee: BANDO CHEMICAL INDUSTRIES, LTD., Kobe (JP)

( * ) Notice: Subject to any disclaimer, the term of this patent is extended or adjusted under 35 U.S.C. 154(b) by 0 days.

(21) Appl. No.: 16/723,521

(22) Filed: Dec. 20, 2019

(65) Prior Publication Data

US 2020/0124136 A1 Apr. 23, 2020

Related U.S. Application Data

(63) Continuation of application No. PCT/JP2018/021698, filed on Jun. 6, 2018.

(30) Foreign Application Priority Data

Jul. 19, 2017 (JP) .............................. JP2017-140065

(51) Int. Cl.
*F16G 1/10* (2006.01)
*D06M 15/227* (2006.01)
*D06M 23/08* (2006.01)
*F16G 1/28* (2006.01)

(52) U.S. Cl.
CPC ............. *F16G 1/10* (2013.01); *D06M 15/227* (2013.01); *D06M 23/08* (2013.01); *F16G 1/28* (2013.01)

(58) Field of Classification Search
CPC ..... F16G 1/10; F16G 1/28; F16G 1/08; D06M 15/227; D06M 23/08
See application file for complete search history.

(56) References Cited

U.S. PATENT DOCUMENTS

| | | | | |
|---|---|---|---|---|
| 3,876,593 | A * | 4/1975 | Tesoro | D06M 15/227 525/333.9 |
| 4,632,665 | A * | 12/1986 | Skura | B29D 29/08 474/205 |
| 5,417,619 | A * | 5/1995 | Tajima | F16G 1/28 474/260 |
| 6,770,004 | B1 * | 8/2004 | Lofgren | F16G 1/00 474/264 |

(Continued)

FOREIGN PATENT DOCUMENTS

| | | |
|---|---|---|
| JP | 2006-17264 A | 1/2006 |
| JP | 2007-170587 A | 7/2007 |

(Continued)

OTHER PUBLICATIONS

Decision to Grant a Patent for corresponding Japanese Patent Application No. 2018-530183, dated Jul. 12, 2018.

*Primary Examiner* — Michael R Mansen
*Assistant Examiner* — Robert T Reese
(74) *Attorney, Agent, or Firm* — Renner, Otto, Boisselle & Sklar, LLP

(57) ABSTRACT

A power transmission belt (B) has a reinforcing fabric (13) covering a pulley contact surface thereof. A cover layer (15) adheres to the reinforcing fabric (13) to cover surfaces of fibers or yarns constituting the reinforcing fabric (13), and is exposed outside. The cover layer (15) contains crosslinked polyolefin particles (16) in which polyolefin molecules are crosslinked with each other.

13 Claims, 6 Drawing Sheets

(56) References Cited

U.S. PATENT DOCUMENTS

| | | | | |
|---|---|---|---|---|
| 2010/0167861 A1* | 7/2010 | Shiriike | ............... | F16G 1/08 |
| | | | | 474/263 |
| 2010/0323835 A1* | 12/2010 | Furukawa | ............ | F16G 1/28 |
| | | | | 474/260 |
| 2013/0337956 A1* | 12/2013 | Motozaki | ............ | F16G 1/08 |
| | | | | 474/205 |
| 2015/0218357 A1* | 8/2015 | Feng | ................. | F16G 5/06 |
| | | | | 428/36.8 |
| 2016/0010722 A1* | 1/2016 | Kim | ................... | F16G 5/08 |
| | | | | 474/260 |
| 2016/0208889 A1* | 7/2016 | Yoshida | ............ | C08L 15/005 |
| 2016/0298725 A1* | 10/2016 | Ishiguro | ............ | F16G 1/10 |
| 2016/0333963 A1* | 11/2016 | South | ................. | F16G 5/06 |
| 2018/0023663 A1* | 1/2018 | Speer | ................. | F16G 5/20 |
| | | | | 474/261 |
| 2018/0326680 A1* | 11/2018 | Okubo | ................. | F16G 1/12 |
| 2018/0372183 A1* | 12/2018 | Okubo | ................. | C08L 21/00 |
| 2018/0372184 A1* | 12/2018 | Okubo | ................. | C08L 23/00 |

FOREIGN PATENT DOCUMENTS

| | | |
|---|---|---|
| JP | 2007-270917 A | 10/2007 |
| JP | 2014-209026 A | 11/2014 |
| JP | 2017-129255 A | 7/2017 |
| JP | 2017-172691 A | 9/2017 |
| WO | 2010/047121 A1 | 3/2012 |
| WO | 2017/168913 A1 | 4/2018 |

* cited by examiner

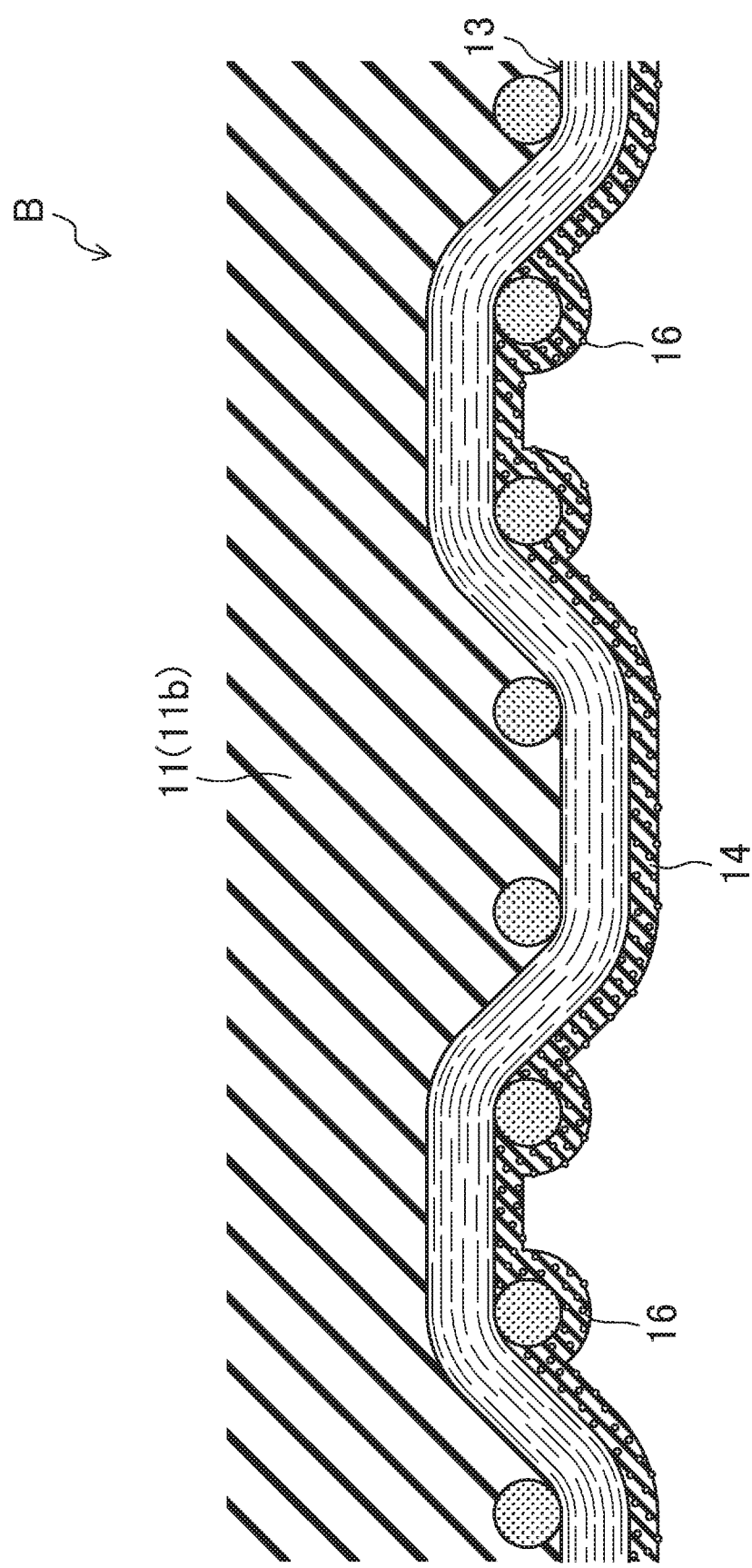

TRANSMISSION BELT AND METHOD FOR PRODUCING SAME

CROSS-REFERENCE TO RELATED APPLICATION

This is a continuation of International Application No. PCT/JP2018/21698 filed on Jun. 6, 2018, which claims priority to Japanese Patent Application No. 2017-140065 filed on Jul. 19, 2017. The entire disclosures of these applications are incorporated by reference herein.

BACKGROUND

A toothed rubber belt generally includes a reinforcing fabric covering a surface of a belt body provided with rubber teeth. For example, Japanese Unexamined Patent Publication No. 2006-17264 (hereinafter referred to as Patent Document 1) discloses a technique of improving wear resistance of a reinforcing fabric of a toothed belt. Specifically, the reinforcing fabric is impregnated with rubber cement to form a rubber layer that adheres to surfaces of fibers or yarns of the fabric, the rubber layer containing polytetrafluoroethylene particles as a friction reducer.

SUMMARY

The present invention provides a power transmission belt having a reinforcing fabric covering a pulley contact surface thereof. The power transmission belt includes: a cover layer which adheres to the reinforcing fabric to cover surfaces of fibers or yarns constituting the reinforcing fabric, and is exposed outside, the cover layer containing crosslinked polyolefin particles in which polyolefin molecules are crosslinked with each other.

The present invention provides a method for producing the power transmission belt of the present invention. The method includes: obtaining the crosslinked polyolefin particles through exposure of uncrosslinked polyolefin particles in which polyolefin molecules are uncrosslinked with each other to radiation.

BRIEF DESCRIPTION OF THE DRAWINGS

FIG. 5 is an enlarged cross-sectional view illustrating a major portion of a toothed belt of a second embodiment.

DETAILED DESCRIPTION

Embodiments will be described in detail below with reference to the drawings.

First Embodiment

Figure 1:
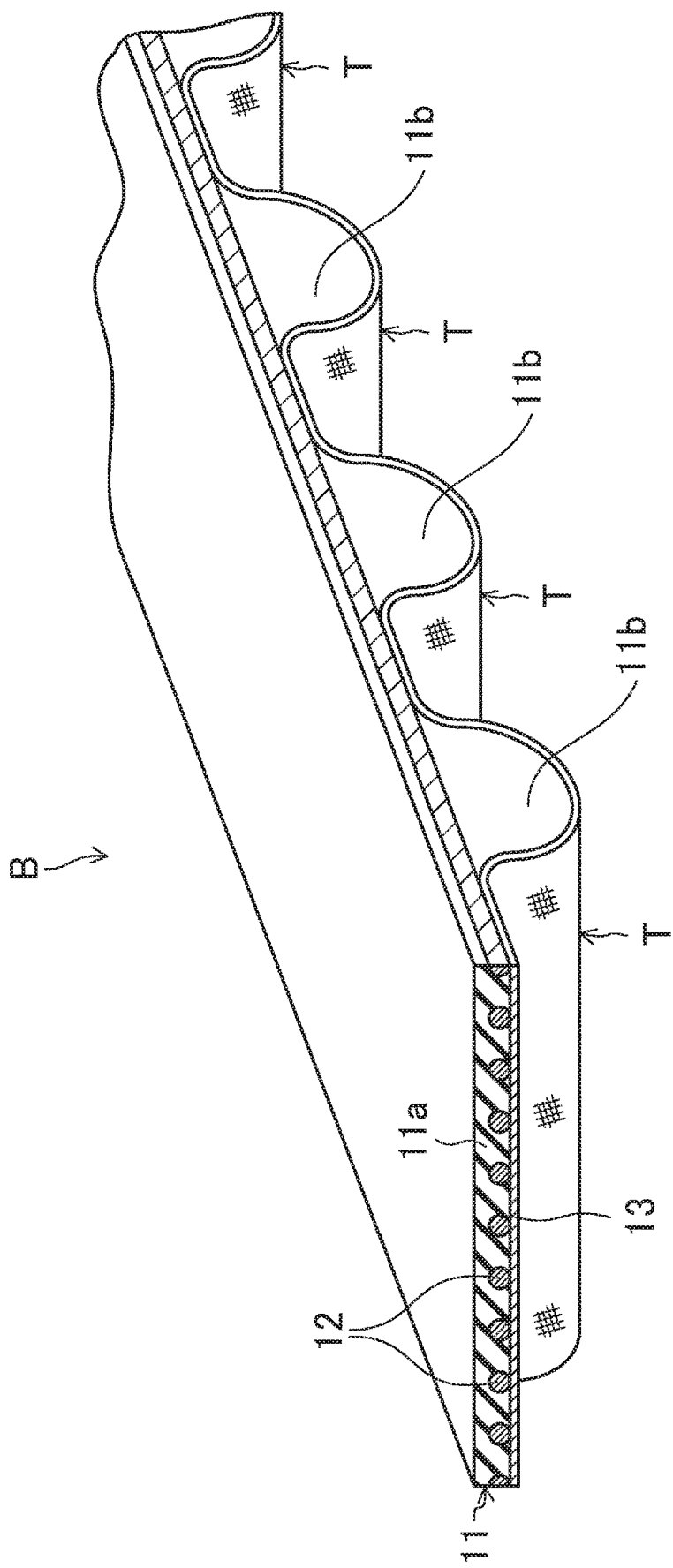
FIG. 1 is a perspective view illustrating a piece of a toothed belt of a first embodiment.

FIG. 1 shows a toothed belt B of a first embodiment. The toothed belt B of the first embodiment is an endless belt used in, for example, an automobile, and a general industrial machine. The toothed belt B of the first embodiment has, for example, a circumferential length of 100 mm or more and 2,000 mm or less, a width of 3 mm or more and 100 mm or less, and a maximum thickness of 1.5 mm or more and 8.0 mm or less.

The toothed belt B of the first embodiment has a plurality of teeth T arranged at a constant pitch on an inner peripheral surface thereof. The pitch of the teeth T is, for example, 1.5 mm or more and 14 mm or less. Each of the teeth T may be a round tooth having a semicircular cross section when viewed from the side, a trapezoidal tooth having a trapezoidal cross section, or in any other shapes. The teeth T may extend in a belt width direction, or may be diagonal teeth extending obliquely with respect to the belt width direction.

The toothed belt B of the first embodiment includes a belt body 11 which is a rubber member, and a cord 12 and a reinforcing fabric 13, both of which are fiber members.

The belt body 11 has a flat rubber portion 11a, and a plurality of rubber teeth 11b arranged at a constant pitch on an inner peripheral surface of the flat rubber portion 11a. The plurality of rubber teeth 11b is integrated with the flat rubber portion 11a.

The belt body 11 is formed of a rubber composition containing a rubber component that has been crosslinked through heating and pressing of an uncrosslinked rubber composition in which the rubber component is blended with compound ingredients.

Examples of the rubber component in the rubber composition forming the belt body 11 include, for example, hydrogenated nitrile rubber (hereinafter referred to as "H-NBR"); chloroprene rubber (hereinafter referred to as "CR"); and an ethylene-α-olefin elastomer, such as ethylene propylene diene terpolymer (hereinafter referred to as "EPDM"). In a suitable embodiment, one or two or more of these rubber components are used. Examples of the compound ingredient include typical agents, such as a vulcanization accelerator aid, an antioxidant, a reinforcement, a plasticizer, a co-crosslinking agent, and a crosslinking agent.

The cord 12 is embedded in an inner peripheral portion of the flat rubber portion 11a of the belt body 11 to form a helix having a pitch in the belt width direction. The cord 12 has an outer diameter of, for example, 0.2 mm or more and 2 mm or less.

The cord 12 is made of a twisted yarn of, for example, glass fibers, aramid fibers, carbon fibers, and metal fibers. Examples of the twisted yarn constituting the cord include a single twist yarn, a plied yarn, and a lang's lay. The cord 12 may include an S-twist yarn and a Z-twist yarn arranged in a double helix form, or an S-twist yarn or a Z-twist yarn alone arranged in a helix form. In a suitable embodiment, the cord 12 undergoes one or two or more of adhesion treatments to achieve adhesion to the belt body 11. The adhesion treatments include: a primary adhesion treatment in which the cord is soaked in a solution of an epoxy resin or an isocyanate resin and then heated; an RFL adhesion treatment in which the cord is soaked in an aqueous solution of resorcinol/formalin/latex (hereinafter referred to as an "RFL aqueous solution") and then heated; and a rubber cement treatment in which the cord is soaked in rubber cement and then dried.

The reinforcing fabric 13 covers the inner peripheral surface of the belt body 11 provided with the plurality of rubber teeth 11b, i.e., a pulley contact surface of the belt. The reinforcing fabric 13 has a thickness of, for example, 0.1 mm or more and 1 mm or less. The teeth T of the toothed belt B of the first embodiment are comprised of the rubber teeth 11b of the belt body 11 covered with the reinforcing fabric 13.

The reinforcing fabric 13 is a fabric material made of fibers, for example, nylon fibers such as nylon 6,6, nylon 4,6, and nylon 6; polyester fibers; aramid fibers; and polyparaphenylene benzobisoxazole (PBO) fibers. Examples of the fabric material constituting the reinforcing fabric 13 include: woven fabrics such as a plain weave fabric, a twill fabric, and a satin fabric; knitted fabrics such as a plain stitch fabric, a rib stitch fabric, and a pearl stitch fabric; and nonwoven fabrics. In a suitable embodiment, the fabric material constituting the reinforcing fabric 13 has stretchability in a belt length direction from the viewpoint of covering the rubber teeth 11b to form the teeth T.

Figure 2:
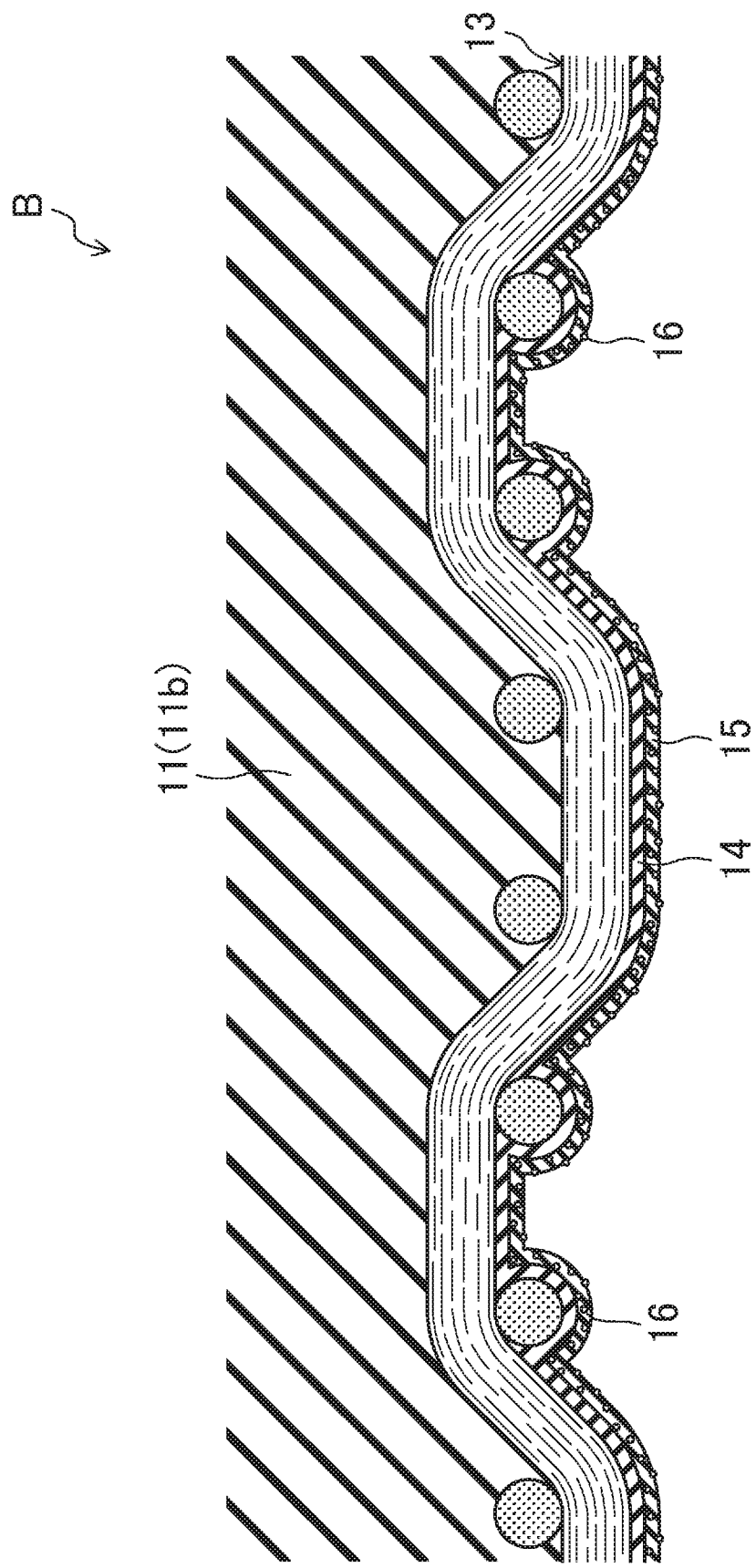
FIG. 2 is an enlarged cross-sectional view illustrating a major portion of the toothed belt of the first embodiment.

To achieve adhesion to the belt body 11, the reinforcing fabric 13 undergoes an RFL adhesion treatment in which the reinforcing fabric is soaked in an RFL aqueous solution and then heated, and a rubber cement soaking treatment in which the reinforcing fabric is soaked in rubber cement and then dried. As shown in FIG. 2, these treatments form an RFL coating layer 14 which adheres to the reinforcing fabric 13 to cover surfaces of the fibers or yarns constituting the reinforcing fabric 13, and a soaking rubber layer 15 (cover layer) which adheres to the RFL coating layer 14 to cover the surfaces of the fibers or yarns of the reinforcing fabric 13, and is exposed outside.

The RFL coating layer 14 is formed of a mixture of a resin component of a condensate of resorcin and formaldehyde and a rubber component derived from a rubber latex. The adhesion amount of the RFL coating layer 14 is, for example, 10 or more and 80 or less in a mass ratio with respect to the mass of the fiber material forming the reinforcing fabric 13 regarded as 100.

The soaking rubber layer 15 is formed of a rubber composition containing a rubber component that has been crosslinked through heating and pressing of an uncrosslinked rubber composition in which a rubber component is blended with a compound ingredient containing crosslinked polyolefin particles 16 in which polyolefin molecules are crosslinked with each other (hereinafter simply referred to as "crosslinked polyolefin particles 16"). Thus, the soaking rubber layer 15 is formed of the rubber composition containing the crosslinked rubber component and the crosslinked polyolefin particles 16. The crosslinked polyolefin particles 16 are dispersed in the layer. The RFL coating layer 14 may also contain the crosslinked polyolefin particles dispersed therein.

The reinforcing fabric 13 may undergo, prior to the RFL adhesion treatment, a primary adhesion treatment in which the reinforcing fabric is soaked in a solution of an epoxy resin or an isocyanate resin and then heated, so that a primary coating layer of an epoxy resin or an isocyanate resin is formed between the fibers constituting the reinforcing fabric 13 and the RFL coating layer 14, i.e., below the RFL coating layer 14. After the rubber cement soaking treatment, the reinforcing fabric may undergo a rubber cement coating treatment in which the surface of the reinforcing fabric 13 facing the belt body 11 is coated with rubber cement and then dried, so that a rubber coating is interposed between the reinforcing fabric 13 and the belt body 11.

The toothed belt B of the first embodiment includes the reinforcing fabric 13 covering the inner surface of the belt serving as the pulley contact surface. The soaking rubber layer 15 adheres to the reinforcing fabric 13 to cover the surfaces of the fibers or yarns constituting the reinforcing fabric 13, and is exposed outside. Further, the soaking rubber layer 15 contains the crosslinked polyolefin particles 16. Thus, the crosslinked polyolefin particles 16 exposed on the surface can give high wear resistance to the belt. As a result, the reinforcing fabric 13 becomes less worn, which provides the belt with high resistance to tooth chipping.

Examples of the rubber component of the rubber composition forming the soaking rubber layer 15 include, for example, H-NBR; CR; and an ethylene-α-olefin elastomer such as EPDM. In a suitable embodiment, one or two or more of these rubber components are used. In a suitable embodiment, this rubber component is the same as the rubber component of the rubber composition forming the belt body 11.

Examples of polyolefin constituting the crosslinked polyolefin particles 16 include: homopolymers such as polyethylene, polypropylene, poly-1-butene, and poly-4-methyl-1-pentene; and copolymers of ethylene and α-olefin such as propylene, 1-butene, 1-hexene, 1-octene, and 4-methyl-1-pentene. As the crosslinked polyolefin particles 16, particles of one or two or more of these substances are suitably used, and polyethylene homopolymer particles are more suitably used.

To obtain high resistance to tooth chipping, in a suitable embodiment, the crosslinked polyolefin particles 16 are comprised of crosslinked ultrahigh molecular weight polyolefin having an average molecular weight (weight average molecular weight, number average molecular weight) of 500,000 or more. To obtain high resistance to tooth chipping, the average molecular weight (weight-average molecular weight, number-average molecular weight) of the ultrahigh molecular weight polyolefin is suitably 1,000,000 or more and 6,000,000 or less, more suitably 1,800,000 or more and 3,500,000 or less, still more suitably 2,000,000 or more and 3,000,000 or less. In a suitable embodiment, the ultra high molecular weight polyolefin is ultrahigh molecular weight polyethylene.

To obtain high resistance to tooth chipping, the average particle diameter of the crosslinked polyolefin particles 16 is suitably 10 µm or more and 200 µm or less, more suitably 100 µm or more and 170 µm or less, still more suitably 100 µm or more and 150 µm or less. The average particle diameter is obtained by taking the arithmetic mean of particle diameters (maximum outer diameter) of 50 or more and 100 or less particles actually measured on a scanning electron microscope image of the crosslinked polyolefin particles 16 in consideration of magnifying power.

To obtain high resistance to tooth chipping, in a suitable embodiment, the crosslinked polyolefin particles 16 are roughly spherical in shape. To obtain high resistance to tooth chipping, the aspect ratio obtained by dividing the maximum outer diameter of the crosslinked polyolefin particles 16 by the minimum outer diameter is suitably 2.0 or less, more suitably 1.5 or less, still more suitably 1.3 or less. The aspect ratio is obtained by taking the arithmetic mean of values obtained by dividing the maximum outer diameter of 50 to 100 particles by the minimum outer diameter actually measured on a scanning electron microscope image of the crosslinked polyolefin particles 16 in consideration of magnifying power. The crosslinked polyolefin particles 16 may be fibrous in shape.

To obtain high resistance to tooth chipping, the crosslinked polyolefin particles 16 suitably have a limiting viscosity [η] of 5 dl/g or more and 50 dl/g or less, more suitably 5 dl/g or more and 30 dl/g or less. The limiting viscosity is measured in decalin at 135° C. To obtain high resistance to tooth chipping, the crosslinked polyolefin particles 16 suitably have a melting point of 125° C. or more and 145° C. or less, more suitably 130° C. or more and 145° C. or less. The melting point is determined by differential scanning calorimetry (DSC).

To obtain high resistance to tooth chipping, the content of the crosslinked polyolefin particles 16 in the rubber composition forming the soaking rubber layer 15 is suitably 20 parts by mass or more and 120 parts by mass or less, more suitably 50 parts by mass or more and 110 parts by mass or less, with respect to 100 parts by mass of the rubber component.

The crosslinked polyolefin particles 16 can be obtained through exposure of uncrosslinked polyolefin particles in which polyolefin molecules are uncrosslinked with each other to radiation. In this case, exposure of the uncrosslinked polyolefin particles to radiation breaks and crosslinks molecular chains of polyolefin, and as a result, the molecular chains are bonded at a crosslinking point. Examples of the radiation include α rays, β rays, γ rays, electron beams, and ions, among which the electron beams or the γ rays are suitably used. The radiation dose is suitably 50 kGy or more and 700 kGy or less, more suitably 100 kGy or more and 500 kGy or less.

The crosslinked polyolefin particles 16 may include particles having hollows inside. The crosslinked polyolefin particles 16 having hollows inside can be obtained through exposure of uncrosslinked polyolefin particles to a sufficiently high dose of radiation.

The rubber composition forming the soaking rubber layer 15 may contain, in addition to the crosslinked polyolefin particles 16, uncrosslinked polyolefin particles in which the polyolefin molecules are uncrosslinked with each other.

Examples of the compound ingredient include a vulcanization accelerator aid, an antioxidant, a reinforcement, a plasticizer, a co-crosslinking agent, and a crosslinking agent.

Examples of the vulcanization accelerator aid include metal oxide such as zinc oxide (zinc white) and magnesium oxide; metal carbonate; fatty acid and its derivatives. One or two or more of these vulcanization accelerator aids are suitably used, and zinc oxide is more suitably used. The content of the vulcanization accelerator aid is, for example, 3 parts by mass or more and 7 parts by mass or less with respect to 100 parts by mass of the rubber component.

Examples of the antioxidant include benzimidazole-based antioxidants, aromatic secondary amine-based antioxidants, and amine ketone-based antioxidants. One or two or more of these antioxidants are suitably used, and a combined use of a benzimidazole-based antioxidant and an aromatic secondary amine-based antioxidant is more suitable. The content of the antioxidant is, for example, 1.5 parts by mass or more and 3.5 parts by mass or less with respect to 100 parts by mass of the rubber component.

Examples of the reinforcement include carbon black and silica. Examples of the carbon black include: channel black; furnace black such as SAF, ISAF, HAF, MAF, FEF, SRF, GPF, and ECF; thermal black such as FT and MT; and acetylene black. One or two or more of these carbon blacks are suitably used, and HAF is more suitably used. In a suitable embodiment, carbon black and silica are used in combination as the reinforcement. When carbon black is used as the reinforcement, the content thereof is, for example, 0 part by mass or more and 100 parts by mass or less with respect to 100 parts by mass of the rubber component. When silica is used as the reinforcement, the content thereof is, for example, 10 parts by mass or more and 30 parts by mass or less with respect to 100 parts by mass of the rubber component. When carbon black and silica are used in combination, the silica content is suitably larger than the carbon black content.

Examples of the plasticizer include, for example, polyether ester; dialkyl sebacate such as dioctyl sebacate (DOS); dialkyl phthalate such as dibutyl phthalate (DBP) and dioctyl phthalate (DOP); and dialkyl adipate such as dioctyl adipate (DOA). One or two or more of these plasticizers are suitably used, and polyether ester is more suitably used. The content of the plasticizer is, for example, 3 parts by mass or more and 10 parts by mass or less with respect to 100 parts by mass of the rubber component.

Examples of the co-crosslinking agent include trimethylolpropane trimethacrylate, m-phenylene dimaleimide, zinc dimethacrylate, and triallyl isocyanurate. One or two or more of these co-crosslinking agents are suitably used, and m-phenylene dimaleimide is more suitably used. The content of the co-crosslinking agent is, for example, 3 parts by mass or more and 7 parts by mass or less with respect to 100 parts by mass of the rubber component.

Examples of the crosslinking agent include sulfur and an organic peroxide. Sulfur alone, an organic peroxide alone, or a combination of them may be used as the crosslinking agent. In a suitable embodiment, the organic peroxide is suitably used, and the content thereof is, for example, 1 part by mass or more and 5 parts by mass or less with respect to 100 parts by mass of the rubber component.

To obtain high resistance to tooth chipping, the adhesion amount of the soaking rubber layer 15 is suitably 2 or more and 200 or less, more suitably 50 or more and 130 or less, in a mass ratio with respect to the mass of the fiber material forming the reinforcing fabric 13 regarded as 100. The soaking rubber layer 15 has a thickness of, for example, 50 μm or more and 500 μm or less.

A method for producing the toothed belt B of the first embodiment will be described below with reference to FIGS. 3 and 4A to 4D. The method for producing the toothed belt B of the first embodiment includes a material preparation step, a shaping step, a crosslinking step, and a finishing step.

<Material Preparation Step>

The rubber component for the belt body 11 is masticated, a compound ingredient is put into it and kneaded, and then the obtained uncrosslinked rubber composition is subjected to calender molding to produce an uncrosslinked rubber sheet 11'.

An RFL adhesion treatment and a rubber cement adhesion treatment are sequentially given to the cord 12. Specifically, the cord 12 is soaked in an RFL aqueous solution and heated, and thereafter, the cord 12 is soaked in rubber cement and dried. The cord 12 may undergo, prior to the RFL adhesion treatment, a primary adhesive treatment in which the cord 12 is soaked in a solution of an epoxy resin or an isocyanate resin and then heated.

Then, an RFL adhesion treatment and a rubber cement soaking treatment are sequentially given to the reinforcing fabric 13. Specifically, the reinforcing fabric 13 is soaked in an RFL aqueous solution and heated, and thereafter, the reinforcing fabric 13 is soaked in rubber cement and dried. The rubber cement soaking treatment forms an uncrosslinked rubber composition layer which adheres to the reinforcing fabric 13 to cover the surfaces of the fibers or yarns constituting the reinforcing fabric 13, and is exposed outside. The rubber cement used in the rubber cement soaking treatment can be prepared by masticating a rubber component for the soaking rubber layer 15, kneading the rubber component together with a compound ingredient containing the crosslinked polyolefin particles 16 added thereto, and dissolving the obtained uncrosslinked rubber composition in an organic solvent. The crosslinked polyolefin particles 16 are obtained through exposure of uncrosslinked polyolefin particles to radiation. Examples of the organic solvent used for the preparation of the rubber cement include toluene and methyl ethyl ketone. The rubber cement has a solid content concentration of, for example, 10% by mass or more and 50% by mass or less.

<Shaping Step>

Figure 3:
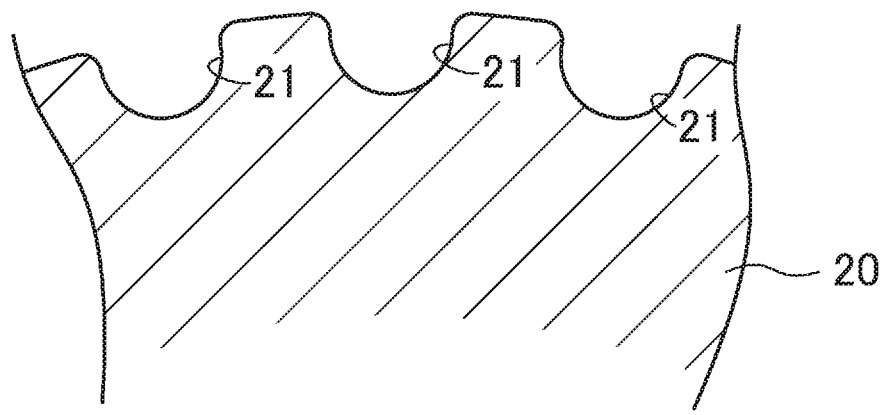
FIG. 3 is a cross-sectional view illustrating a portion of a belt forming mold.

FIG. 3 shows a belt forming mold 20 used for the production of the toothed belt B of the first embodiment. A plurality of teeth forming grooves 21 are arranged on an outer peripheral surface of the belt forming mold 20 at intervals in the circumferential direction.

Figure 4A:
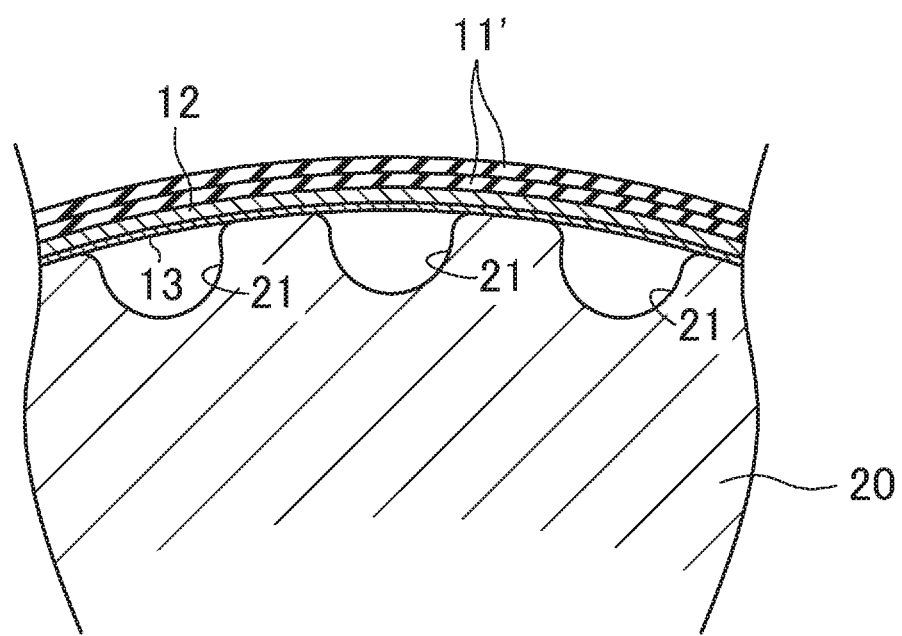
FIG. 4A is a first view illustrating a method for producing the toothed belt of the first embodiment.

First, the reinforcing fabric 13 is rolled into a cylindrical shape and placed on the outer peripheral surface of the belt forming mold 20, and the cord 12 is helically wound on the reinforcing fabric 13 as shown in FIG. 4A. Then, the uncrosslinked rubber sheet 11' is wound thereon, thereby forming an uncrosslinked slab S' on the belt forming mold 20. In a suitable embodiment, the uncrosslinked rubber sheet 11' is wound such that the grain direction thereof corresponds to the belt length direction.

<Crosslinking Step>

Figure 4B:
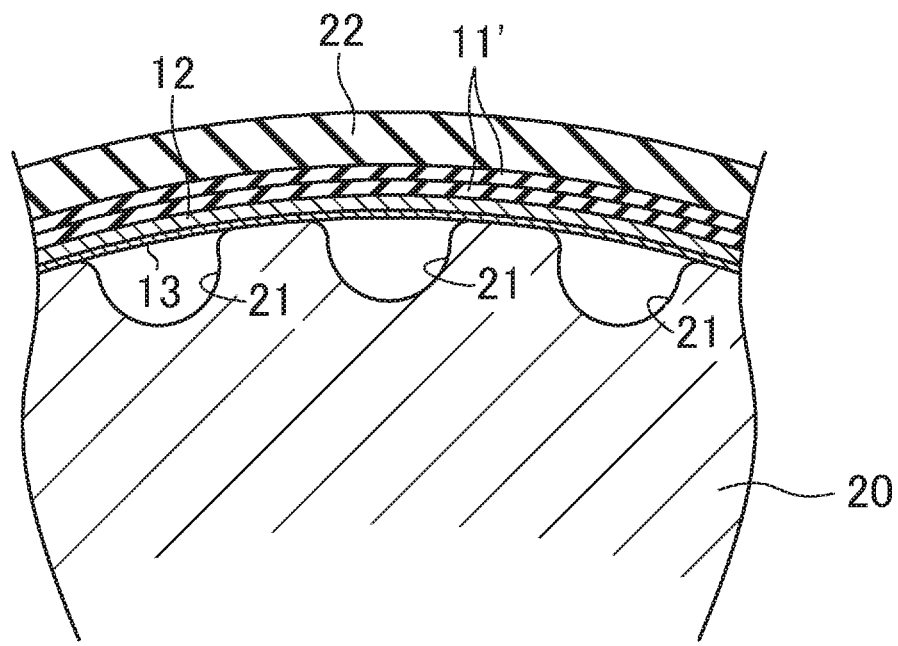
FIG. 4B is a second view illustrating the method for producing the toothed belt of the first embodiment.
Figure 4C:
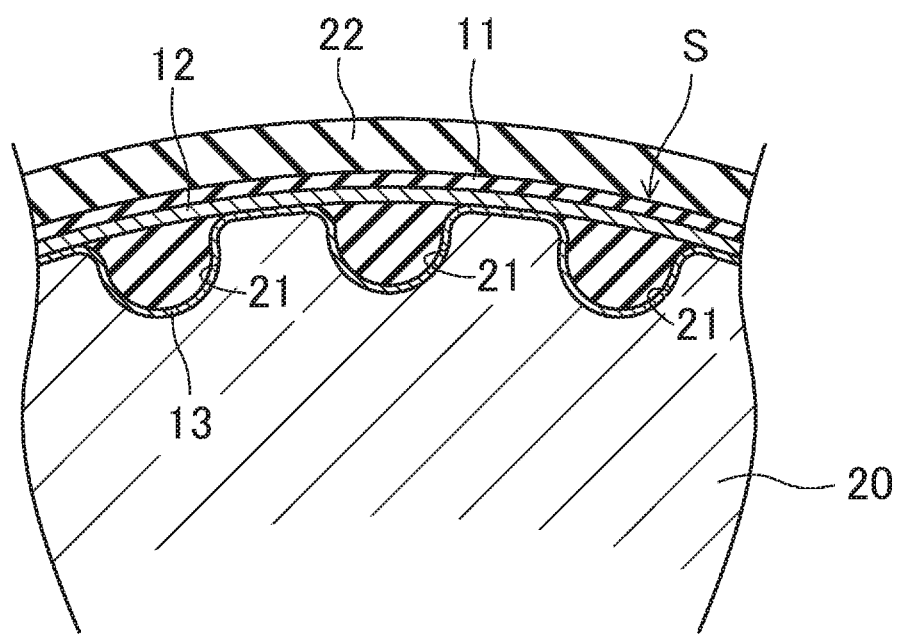
FIG. 4C is a third view illustrating the method for producing the toothed belt of the first embodiment.

As illustrated in FIG. 4B, a rubber sleeve 22 is placed on the uncrosslinked slab S' on the belt forming mold 20. The belt forming mold 20 with the rubber sleeve 22 is placed in a vulcanizer. The vulcanizer is sealed and filled with high-temperature and high-pressure steam, and the belt forming mold 20 with the rubber sleeve 22 is held in the vulcanizer for a predetermined molding time. In this step, the uncrosslinked slab S' is heated and pressed onto the belt forming mold 20. This allows the uncrosslinked rubber sheet 11' to go into the plurality of teeth forming grooves 21 of the belt forming mold 20 through the turns of the cord 12 while pressing the reinforcing fabric 13, and the rubber component is crosslinked to be the rubber composition. At the same time, the cord 12 is integrated with the rubber composition. The reinforcing fabric 13 is also integrated with the rubber composition. Further, the rubber component of the uncrosslinked rubber composition layer adhering to the surfaces of the fibers or yarns constituting the reinforcing fabric 13 is crosslinked through the rubber cement soaking treatment, thereby forming the soaking rubber layer 15. Then, finally, a cylindrical belt slab S is molded as shown in FIG. 4C.

<Finishing Step>

The inside of the vulcanizer is depressurized to relieve the sealing, and the belt slab S molded between the belt forming mold 20 and the rubber sleeve 22 is removed and cut into rings of a predetermined width. Thus, the toothed belt B of the first embodiment is obtained.

Second Embodiment

A toothed belt B of a second embodiment includes, as shown in FIG. 5, an RFL coating layer 14 (cover layer) which adheres to the reinforcing fabric 13 to cover the surfaces of the fibers or yarns constituting the reinforcing fabric 13, and is exposed outside.

The RFL coating layer 14 is formed of a mixture of a resin component of a condensate of resorcin and formaldehyde and a rubber component derived from rubber latex, into which the crosslinked polyolefin particles 16 are dispersed.

Thus, the RFL coating layer 14 contains the crosslinked polyolefin particles 16 dispersed therein.

The toothed belt B of the second embodiment includes the reinforcing fabric 13 covering the inner surface of the belt serving as the pulley contact surface. The RFL coating layer 14 adheres to the reinforcing fabric to cover the surfaces of the fibers or yarns constituting the reinforcing fabric 13, and is exposed outside. Further, the RFL coating layer 14 contains the crosslinked polyolefin particles 16. Thus, the crosslinked polyolefin particles 16 exposed on the surface can give high wear resistance to the belt. As a result, the reinforcing fabric 13 becomes less worn, which provides the belt with high resistance to tooth chipping.

In the resin component contained in the RFL coating layer 14, the molar ratio between resorcin (R) and formaldehyde (F) is, for example, R (mol)/F (mol)=1/2.5 or more and 1/0.8 or less. Examples of the rubber component (L) derived from a rubber latex contained in the RFL coating layer 14 include vinylpyridine-styrene-butadiene rubber (Vp•SBR), styrene-butadiene rubber (SBR), 2,3-dichlorobutadiene rubber (2,3-DCB), natural rubber (NR), H-NBR, and CR. In a suitable embodiment, one or two or more of these rubber components (L) derived from the rubber latex are used. In the RFL coating layer 14, the mass ratio between the condensate (RF) of resorcin (R) and formaldehyde (F) and the rubber component (L) derived from the rubber latex is, for example, RF/L=1/20 or more and 1/5 or less.

To obtain high resistance to tooth chipping, the content of the crosslinked polyolefin particles 16 in the RFL coating layer 14 is suitably 10% by mass or more and 60% by mass or less, more suitably 25% by mass or more and 55% by mass or less.

To obtain high resistance to tooth chipping, the adhesion amount of the RFL coating layer 14 is suitably 5 or more and 100 or less, more suitably 20 or more and 80 or less in a mass ratio with respect to the mass of the fiber material forming the reinforcing fabric 13 regarded as 100. The RFL coating layer 14 has a thickness of, for example, 50 μm or more and 500 μm or less.

In the method for producing the toothed belt B of the second embodiment, the RFL aqueous solution used in the RFL adhesion treatment given to the reinforcing fabric 13 in the material preparation step can be prepared by mixing a rubber latex with an aqueous solution of an initial condensate of resorcin and formaldehyde, and dispersing the crosslinked polyolefin particles 16 in the mixture. The crosslinked polyolefin particles 16 are obtained through exposure of uncrosslinked polyolefin particles to radiation. The RFL aqueous solution has a solid content concentration of, for example, 5% by mass or more and 30% by mass or less.

The reinforcing fabric 13 may undergo, prior to the RFL adhesion treatment, a primary adhesion treatment in which the reinforcing fabric is soaked in a solution of an epoxy resin or an isocyanate resin and then heated, so that a primary coating layer of an epoxy resin or an isocyanate resin is formed between the fibers constituting the reinforcing fabric 13 and the RFL coating layer 14, i.e., below the RFL coating layer 14. After the RFL adhesion treatment, the reinforcing fabric may further undergo a rubber cement coating treatment. Specifically, the surface of the reinforcing fabric 13 facing the belt body 11 may be coated with rubber cement and then dried, so that a rubber coating is formed between the reinforcing fabric 13 and the belt body 11.

The other features and advantages and the production method are the same as those of the first embodiment.

Other Embodiments

In the first and second embodiments, the toothed belt B has been described as a non-limiting example. The present technique is applicable to a friction transmission belt such as a flat belt, a V-belt, and a V-ribbed belt.

In the first and second embodiments, the belt body 11 formed of a rubber composition has been described as a non-limiting example. The belt body 11 may be formed of a cured polyurethane composition obtained through heating and pressing a urethane prepolymer composition in which a urethane polymer is blended with a compound ingredient such as a curing agent or a plasticizer, or a thermoplastic resin composition in which a thermoplastic resin such as polyurethane is blended with a compound ingredient such as a plasticizer.

In the first and second embodiments, the toothed belt B having the teeth T formed on the inner peripheral surface thereof has been described as a non-limiting example. The present technique is applicable to a double-side toothed belt having teeth formed on each of the inner and outer peripheral surfaces thereof.

In the first and second embodiments, the endless toothed belt B has been described as a non-limiting example. The present technique is applicable to an open end belt.

EXAMPLES (Toothed Belt)

Example

First, uncrosslinked polyethylene particles in which polyethylene molecules are uncrosslinked with each other (HI-ZEX MILLION 240S manufactured by Mitsui Chemical Co., Ltd., average particle diameter: 120 µm, weight average molecular weight: 2,000,000) were exposed to an electron beam of 200 kGy to crosslink the polyethylene molecules with each other, thereby obtaining crosslinked polyethylene particles. The crosslinked polyethylene particles thus obtained had hollows inside.

Next, H-NBR (ZSC2195H manufactured by Zeon Corporation) reinforced with finely dispersed zinc methacrylate was placed as a rubber component and masticated in a chamber of a hermetic Banbury mixer. Then, to 100 parts by weight of the rubber component, added were 90 parts by mass of the crosslinked polyethylene particles previously prepared, 5 parts by mass of zinc oxide as a vulcanization accelerator aid (zinc oxide Type II manufactured by Sakai Chemical Industry Co., Ltd.), 2 parts by mass of a benzimidazole-based antioxidant (NOCRAC MB manufactured by OUCHI SHINKO CHEMICAL INDUSTRIAL CO., LTD.), 0.5 parts by mass of an aromatic secondary amine-based antioxidant (NOCRAC CD manufactured by OUCHI SHINKO CHEMICAL INDUSTRIAL CO., LTD.), 5 parts by mass of HAF carbon black as a reinforcement (SEAST 3 manufactured by Tokai Carbon Co., Ltd.), 20 parts by mass of silica as a reinforcement (ULTRASIL VN3 manufactured by Evonik Japan), 10 parts by mass of a polyether ester-based plasticizer (ADEKACIZER RS-700 manufactured by ADEKA CORPORATION), 3 parts by mass of m-phenylene dimaleimide as a co-crosslinking agent (VULNOC PM manufactured by OUCHI SHINKO CHEMICAL INDUSTRIAL CO., LTD.), and 2.4 parts by mass of an organic peroxide as a crosslinking agent (PERBUTYL P manufactured by NOF CORPORATION), and the mixture was kneaded to obtain an uncrosslinked rubber composition. The obtained uncrosslinked rubber composition was dissolved in methyl ethyl ketone to prepare rubber cement having a solid content concentration of 40% by mass.

A reinforcing fabric, which was a twill fabric with warps and wefts made of nylon 6,6 fibers, was subjected to an RFL adhesion treatment, and then to a rubber cement soaking treatment. Specifically, the reinforcing fabric was soaked in the rubber cement thus prepared, and then dried.

A toothed belt of Example configured in the same manner as that of the first embodiment was produced using the reinforcing fabric thus obtained. The toothed belt of Example had a soaking rubber layer which adheres to the reinforcing fabric to cover the surfaces of the fibers or yarns constituting the reinforcing fabric, and is exposed outside. The soaking rubber layer contained the crosslinked polyethylene particles dispersed therein.

The toothed belt of Example had a length of 840 mm, a width of 10 mm, and round teeth of S8M (arranged at a pitch of 8 mm). The belt body was formed of a rubber composition containing, as a rubber component, H-NBR reinforced with finely dispersed zinc methacrylate. The cord was made of a twisted yarn of glass fibers that had undergone an RFL adhesion treatment and a rubber cement adhesion treatment.

Comparative Example

A toothed belt of Comparative Example was produced in the same manner as the belt of Example except that uncrosslinked polyethylene particles with no exposure to the electron beam were used in place of the crosslinked polyethylene particles.

Figure 6:
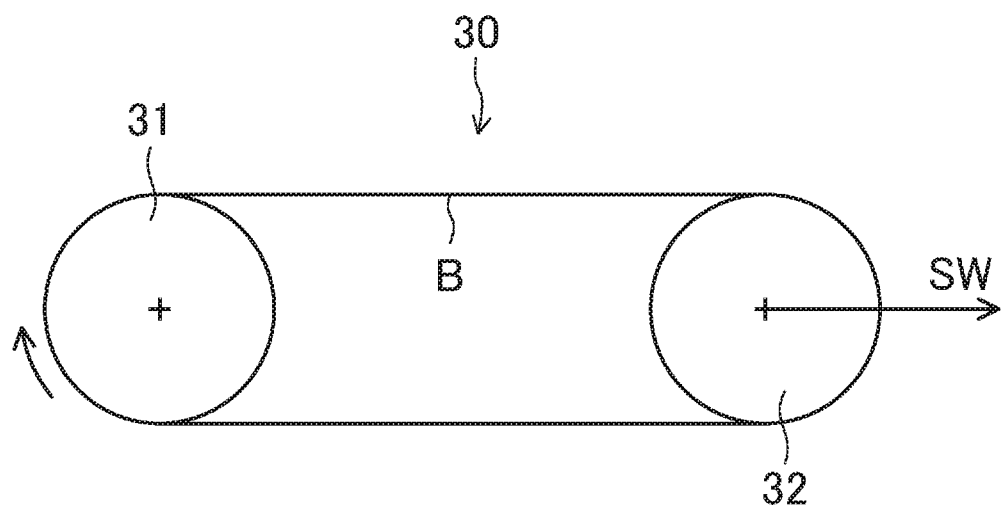
FIG. 6 illustrates a layout of pulleys of a belt running tester.

(Test Method) FIG. 6 illustrates a layout of pulleys of a belt running tester 30.

The belt running tester 30 has a drive pulley 31 having 22 teeth corresponding to the teeth shape of S8M, and a driven pulley 32 having 22 teeth configured in the same manner as the drive pulley 31 and arranged on the right side of the drive pulley 31. The driven pulley 32 is movable in a lateral direction to be able to receive an axial load.

Each of the toothed belts B of Example and Comparative Example was looped around the drive pulley 31 and the driven pulley 32. A constant axial load SW (set weight) of 1000 N toward the right side was applied to the driven pulley 32 to give tension to the belt, and a running torque of 13 N·m was applied. Then, the drive pulley 31 was rotated at 5000 rpm to run the belt. The running of the belt was suspended at regular time intervals to check the chipping of the teeth, i.e., whether the teeth were chipped or not. The running of the belt was finished when the chipping was found, and the belt running time till this point was regarded as a belt life until tooth chipping.

(Test Results)

Figure 7:
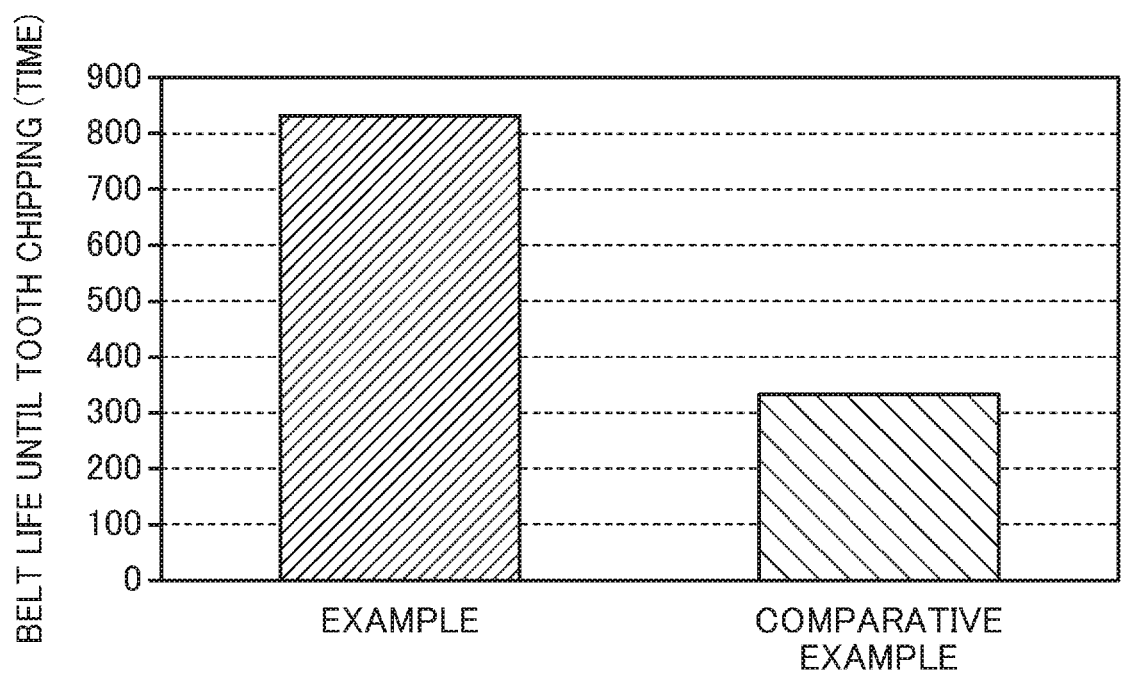
FIG. 7 is a graph showing belt life until tooth chipping of belts of Example and Comparative Example.

FIG. 7 shows the belt life until tooth chipping of the belts of Example and Comparative Example.

FIG. 7 indicates that the toothed belt of Example containing the crosslinked polyethylene particles in the soaking rubber layer has the life until tooth chipping twice or more greater than the belt of Comparative Example containing the uncrosslinked polyethylene particles in the soaking rubber layer. This is presumably because polyethylene molecules in the crosslinked polyethylene particles of Example are crosslinked, which significantly improves wear resistance. As a result, the reinforcing fabric becomes less worn, and the resistance to tooth chipping is improved.

The embodiments have been described above as example techniques of the present disclosure, in which the attached drawings and the detailed description are provided. As such, elements illustrated in the attached drawings or the detailed description may include not only essential elements for solving the problem, but also non-essential elements for solving the problem in order to illustrate such techniques. Thus, the mere fact that those non-essential elements are shown in the attached drawings or the detailed description should not be interpreted as requiring that such elements be essential. Since the embodiments described above are intended to illustrate the techniques in the present disclosure, it is intended by the following claims to claim any and all modifications, substitutions, additions, and omissions that fall within the proper scope of the claims appropriately interpreted in accordance with the doctrine of equivalents and other applicable judicial doctrines.

What is claimed is:

1. A power transmission belt having a reinforcing fabric covering a pulley contact surface thereof, the power transmission belt comprising:
    a cover layer which adheres to the reinforcing fabric to cover surfaces of fibers or yarns constituting the reinforcing fabric, and is exposed outside, the cover layer containing crosslinked polyolefin particles that are precured additives dispersed in a matrix of the cover layer, in which each crosslinked polyolefin particle includes polyolefin molecules crosslinked with each other.

2. The power transmission belt of claim 1, wherein the crosslinked polyolefin particles have a limiting viscosity of 5 dl/g or more and 50 dl/g or less.

3. The power transmission belt of claim 1, wherein the crosslinked polyolefin particles are comprised of crosslinked ultrahigh molecular weight polyolefin having an average molecular weight of 500,000 or more.

4. The power transmission belt of claim 1, wherein the crosslinked polyolefin particles have an aspect ratio of 2.0 or less.

5. The power transmission belt of any one of claim 1, wherein
    the crosslinked polyolefin particles have an average particle diameter of 10 µm or more and 200 µm or less.

6. The power transmission belt of claim 1, wherein the crosslinked polyolefin particles include particles having hollows inside.

7. The power transmission belt of claim 1, wherein the cover layer is a rubber layer formed of a rubber composition containing a crosslinked rubber component and the crosslinked polyolefin particles.

8. The power transmission belt of claim 7, wherein the rubber layer is a soaking rubber layer which adheres to an RFL coating layer which adheres to the reinforcing fabric to cover surfaces of fibers or yarns constituting the reinforcing fabric.

9. The power transmission belt of claim 8, wherein the RFL coating layer also contains the crosslinked polyolefin particles.

10. The power transmission belt of claim 7, wherein
    a content of the crosslinked polyolefin particles in the rubber composition forming the rubber layer is 20 parts by mass or more and 120 parts by mass or less with respect to 100 parts by mass of the rubber component.

11. The power transmission belt of claim 1, wherein the cover layer is an RFL coating layer containing the crosslinked polyolefin particles.

12. The power transmission belt of claim 11, wherein
    a content of the crosslinked polyolefin particles in the RFL coating layer is 10% by mass or more and 60% by mass or less.

13. A power transmission belt having a reinforcing fabric covering a pulley contact surface thereof, the power transmission belt comprising:
    a cover layer which adheres to the reinforcing fabric to cover surfaces of fibers or yarns constituting the reinforcing fabric, and is exposed outside, the cover layer containing crosslinked polyolefin particles obtained through exposure of uncrosslinked polyolefin particles, in which polyolefin molecules are uncrosslinked with each other, to radiation.

* * * * *